(12) United States Patent
Li

(10) Patent No.: US 7,848,502 B2
(45) Date of Patent: Dec. 7, 2010

(54) METHOD FOR IMPLEMENTING SERVICES ON A NETWORK ELEMENT BASED ON MULTIPLE IDS

(75) Inventor: Wang Li, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 1182 days.

(21) Appl. No.: 11/477,551

(22) Filed: Jun. 30, 2006

(65) Prior Publication Data

US 2007/0074039 A1    Mar. 29, 2007

Related U.S. Application Data

(63) Continuation of application No. PCT/CN2005/000010, filed on Jan. 4, 2005.

(30) Foreign Application Priority Data

Jan. 4, 2004    (CN) .................... 2004 1 0002353

(51) Int. Cl.
    *H04M 3/42* (2006.01)
(52) U.S. Cl. .................... 379/201.05; 379/201.01; 379/201.03
(58) Field of Classification Search ............... 379/201, 379/201.01, 201.05, 201.03, 201.12; 709/238, 709/241, 226; 370/217
    See application file for complete search history.

(56) References Cited

U.S. PATENT DOCUMENTS

| 7,545,736 | B2 * | 6/2009 | Dziong et al. ............... 370/217 |
| 7,689,693 | B2 * | 3/2010 | Doshi et al. ................. 709/226 |
| 2004/0193728 | A1 * | 9/2004 | Doshi et al. ................. 709/238 |

(Continued)

FOREIGN PATENT DOCUMENTS

CN    1392686 A    1/2003

(Continued)

OTHER PUBLICATIONS

Sungang Weixueqin, "Routing Technique of Control Plane In ASON", World Telecommunications, No. 12, Dec. 2003, pp. 39-42.

(Continued)

*Primary Examiner*—Thjuan K Addy
(74) *Attorney, Agent, or Firm*—Conley Rose, P.C.; Grant Rudolph

(57) ABSTRACT

A method for implementing services on an ASON (automatic switched optical network) network element based on multiple IDs is disclosed, including: a network element setting an ID corresponding to a new service in local as an active ID; the network element advertising an ID information including the newly set active ID over the network by a routing protocol; each adjacent network element which is connected with the network element via a Traffic Engineering (TE) link acquiring the newly set active ID, setting the newly set active ID as its new opposite-end active ID of the TE link, and advertising over the network an link information which contains the new opposite-end active ID and its current active ID; when implementing the new service on the network, calculating paths based on the new active ID, and implementing the new service according to the calculation result. This method makes it possible to guarantee the normal operation of old services on an ASON network element while creating new services based on newly set IDs.

16 Claims, 2 Drawing Sheets

U.S. PATENT DOCUMENTS

2004/0205239 A1* 10/2004 Doshi et al. .............. 709/241

FOREIGN PATENT DOCUMENTS

| CN | 1464674 A | 12/2003 |
| JP | 7-58771 A | 3/1995 |
| WO | WO 01/72003 A2 | 9/2001 |
| WO | WO 01/76159 A | 10/2001 |
| WO | WO 02/15491 A | 2/2002 |

OTHER PUBLICATIONS

Bala Rajagopalan Tellium et al., "LDP and RSVP Extensions for Optical UNI Signaling"; IETF Standard-Working Draft, Internet Engineering Task Force, IETF, CH, Oct. 2003 XP015000185 ISSN: 0000-0004. the whole document.

Katz K Kompella Juniper Networks D Yeung Procket Networks D: "Traffic Engineering (TE) Extensions to OSPF Version 2" IETF Standard, Internet Engineering Task Force, IETF, CH, Sep. 2003 XP 015009412 ISSN: 0000-0003 abstract p. 1, line 15- p. 7, line 10.

Grammel G. et al., "Automatic Switched Optical Network (ASON) Architecture and its related Protocols" Internet Citation [Online] Nov. 2001, XP002277690, retrieved from the Internet; URL: http://www.ietf.org/proceedings/01dec/I-D/draft-ietf-ipo-ason-01.txt> [retrieved on Apr. 22, 2004] the whole document.

Lang J et al., "Link Management Protocol (LMP)" IETF Standard-Working-Draft, Internet Engineering Task Force, IETF, CH, vol. ccamp, 20. 10, Oct. 2003, XP015038142 ISSN: 0000-0004 abstract p. 47, line 15—p. 64, line 20.

Foreign communication from a counterpart application, PCT application PCT/CN2005/000010, English Translation Written Opinion dated Apr. 14, 2005, 3 pages.

Technical Documentation, JUNOS 6.1 Software Documentation, Release 6.1 published 2003.

"Notice of Opposition," Submitted to the EPO by Michalski Huttermann on Jun. 22, 2010, 35 pages.

"Enhanced Content Specification," Advanced Television Enhancement Forum, Copyright ATVEF, 2000.

Lang, J., Editor, "Link Management Protocol (LMP)," draft ietf-ccamp-lmp-09.txt, Jun. 2003.

English Translation PCT Application, PCT/CN2005/000010, Submitted on Aug. 12, 2010.

* cited by examiner

METHOD FOR IMPLEMENTING SERVICES ON A NETWORK ELEMENT BASED ON MULTIPLE IDS

CROSS-REFERENCE TO RELATED APPLICATIONS

This is a continuation of International Application No. PCT/CN2005/000010, filed on Jan. 4, 2005, now published as WO 2005/067206, published date Jul. 21, 2005, which designated the United States; which claims priority of Chinese Patent Application No. 200410002353.1, filed Jan. 4, 2004, the disclosure of each application is hereby incorporated by reference in their entirety.

FIELD OF THE INVENTION

The present invention relates to the field of network communications, and more particularly, to a method for implementing services on a network element of Automatic Switched Optical Network based on multiple IDs.

BACKGROUND OF THE INVENTION

Along with the development of network communication technology, the application of the optical network's communications is increasingly popular. In a traditional optical network, services are typically set in a static way. However, Automatic Switched Optical Network (ASON) has an additional function of generating a service automatically on the basis of a traditional optical network, making an optical network transformed into a comprehensive system with both a transmission function and a function for switching from a system simply for implementing a transmission function. In ASON, channels for bearing services and switching nodes constitute a transmission plane. In addition, the interaction of control information between the nodes is needed to perform the automatic switching function, which constructs a data communication network based on the Internet Protocol (IP) in ASON. This data communication network constitutes a control plane.

In ASON, an appropriate ID is set for each network element so as to ensure the reliable transfer of data and control information between the network elements.

At present, each network element in ASON is set statically with only one ID for uniquely identifying this network element in a network. At the same time, the ID may be used as an IP address of the network element in a control plane, which makes the ID identical with the IP address, while it is also possible to set an IP address for a network element which is different from the ID thereof.

Along with the developing of network services, however, networks have to be re-organized when being enlarged or reconstructed. In such cases, it is needed for each network element to carry out a new service by using a new ID. Since a network element is identified by an ID in ASON, all the services are generated on that ID. So if just changing the existing ID into a new ID in order to carry out a new service, all the previous services will be disabled. On the other hand, if continuing using the existing ID to implement a new service, it would be also possible that the existing ID is unable to meet the demand of the new service.

SUMMARY

In accordance with this invention, a method for implementing services on a network element based on multiple IDs is provided, wherein the method includes:

a network element setting an ID corresponding to a new service in local as an active ID; the network element advertising an ID information including the newly set active ID over the network by a routing protocol; each adjacent network element which is connected with the network element via a Traffic Engineering (TE) link acquiring the newly set active ID, setting the newly set active ID as its new opposite-end active ID of the TE link, and advertising over the network an link information which contains the new opposite-end active ID and its current active ID; when implementing the new service on the network, calculating paths based on the new active ID, and implementing the new service according to the calculation result.

Before the step of a network element setting an ID corresponding to a new service in local as an active ID, the method may further include: creating multiple loop-back interfaces in advance on the control planes of the network elements, setting a network-layer ID on each of the loop-back interface, and setting each of the network-layer IDs on the transmission plane.

If the ID corresponding to the new service does not exist on the network element, before the step of a network element setting an ID corresponding to a new service in local as an active ID, the method may further include: creating a new loop-back interface on the control plane of the network element, setting a new network-layer ID on the loop-back interface, making the value of this network-layer ID identical with the value of the ID corresponding to the new service to be implemented, and setting the network-layer ID as the ID corresponding to the new service on the transmission plane.

In the above solutions, the step of advertising the ID information may include: bearing the ID information in a router address Type Length Value (TLV) advertised by a Traffic Engineering Link State Announcement (TE_LSA) of the routing protocol, indicating the new ID included in the ID information as a new active ID, and releasing the ID information over the network by the routing protocol.

In the above solutions, the step of each adjacent network element which is connected with the network element via a TE link acquiring the newly set active ID may include: the network element that is set with a new active ID bearing the new active ID in C-Type 1 and C-Type 2 of a NODE_ID Class which is in a Link Management Protocol (LMP) message, each of its adjacent network elements obtaining the new active ID by periodically checking; and the step of advertising the link information over the network may include: bearing the obtained new active ID and its current active ID in the link TLV advertised by a TE_LSA of the routing protocol, indicating the obtained new active ID as its new opposite-end active ID, and releasing the link information over the network via the routing protocol.

As can be seen from the above solution provided by this invention, a relatively simple method is employed in this invention to implement the configuration of multiple IDs on a network element of ASON. So that, it is possible to use the newly set ID when a new service is carried out in a network, while a previous ID can be used when a previous service is created. That is, in accordance with this invention, it is possible to set different IDs for different services on one network element and use such different IDs when carrying out different services. Therefore, in accordance with this invention, the IDs set for each network element can not only satisfy the application demands of the new services but also meet the application requirements of the old services. As a result, when network enlargement or reconstruction leads to the case of different IDs being needed for different services, the normal implement of the new and old services would be ensured.

DETAILED DESCRIPTION OF PREFERRED EMBODIMENTS

The present invention aims to set multiple IDs for one network element of ASON to use different IDs for different services. The setting method is to create multiple loop-back interfaces on the control plane, set a new ID on each of the loop-back interfaces and then set each of the IDs on the transmission plane. When it is needed to create a new service on the network, set the ID corresponding to the new service as an active ID and advertise current active ID of each network element over the network, so that the new service could be created based on these active IDs. Meanwhile, the old service created on an inactive ID continues running normally based on its own ID which has ever been an active ID. Here, both of the new and old services are carried out in the network. The old service refers to a service created on an existing previous active ID, which is set before the current active ID. And the previous active ID for the old service has become an inactive ID now, while the old service can still be implemented normally.

In accordance with this invention, multiple IDs may be set for a network element when setting network element's IDs for the first time. Thereafter different IDs may be used to carry out different services; or a new ID may be added at any time to a network element that has been set one or more IDs according to the need of the network operations and be set as an active ID and advertised over the network so as to implement a new service. As a result, when creating a new service, there may be three operations for processing an ID according to three different circumstances as follows.

The first is that when a network element is a node in the service path, and the ID the service desires has not yet been set on the network element. In this case, the ID corresponding to the service will be added to the network element, set as an active ID, and advertised over the network. The second is that when a network element is a node in the service path, and the ID desired by the service has already existed on the network element which has not been set as an active ID yet. Here, the ID will be set as an active ID, and the active ID will be advertised over the network. The last one is that when the service passes a certain network element and the service's desiring ID is just the current active ID of the network element. At this time, it is not necessary to do any operation for the ID. So no discussion is needed here. There is another case that should be mentioned which is very special. That is, when only one ID is set on the network element, the current service is definitely carried out based on this ID. In this case, no active ID needs to be designated.

When the new ID of each network element is set in the network, the new service corresponding to the active ID can be carried out in the network.

Figure 1:
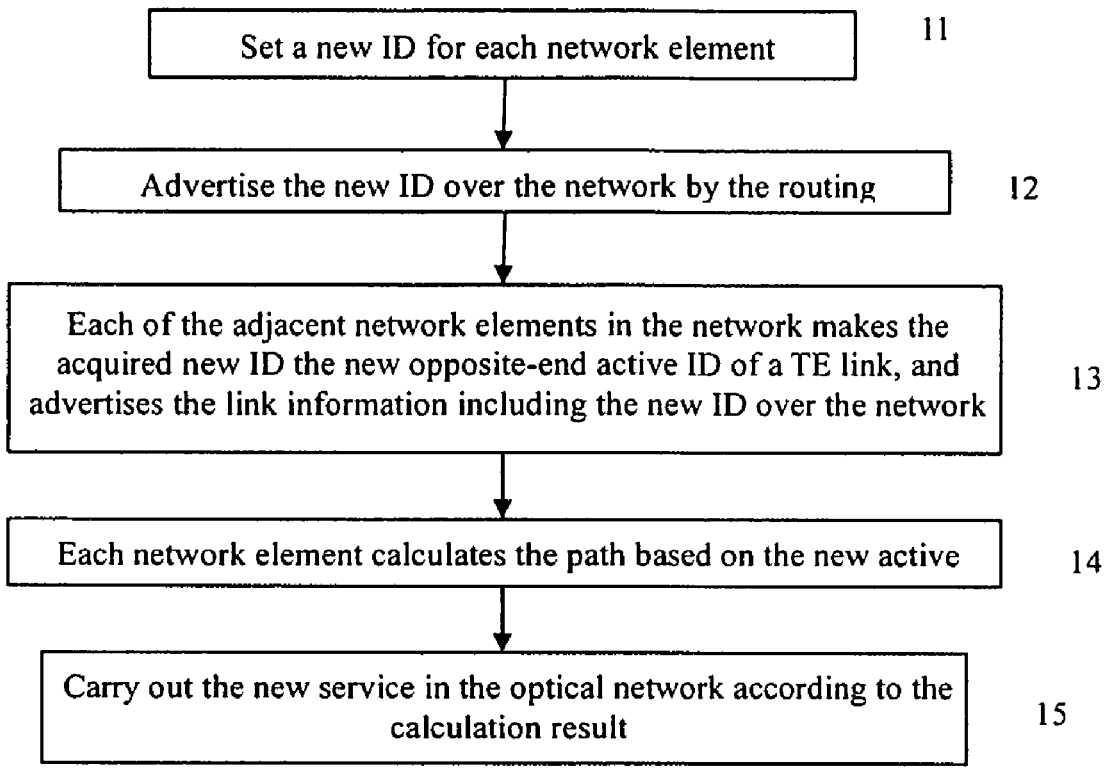
FIG. 1 shows a flowchart for creating a new ID in accordance with this invention.

The first circumstance above is hereinafter described first, i.e., the method of implementing a new service in ASON by creating a new ID, as shown in FIG. 1, specifically includes the following steps:

Step 11: When an ID desired by a new service to be implemented does not exist on a network element, a new ID corresponding to the new service is set for each of the network elements, and then the new ID is set as an active ID.

Specifically, this step includes: creating a new loop-back interface on each of the network elements' control planes which are related to the new service, setting a new network-layer ID on the loop-back interface, the value of which is identical with the new ID's value to be set, setting this new network-layer ID to the transmission plane so that the new ID is obtained, and setting this new ID as an active ID. There may be more than one way of setting an ID as an active ID, e.g., adding a label to the ID so as to indicate it is an active ID.

Step 12: the newly set active ID is released to the routing protocol, and then, it is advertised over the network via the routing protocol, so that, when the new service is carried out in the network, it is possible to make some processing, such as calculating the route and determining the path. etc., based on the new ID.

The specific procedure of advertising a new active ID over the network includes: bearing the current new ID in a router address type length value (TLV) which is advertised by a Transfer Engineering Link State Announcement (TE_LSA) of the routing protocol, and designating this new ID as the active ID of this network element, wherein the current new ID is borne in No 3 or No 4 sub-TLV, or a newly defined sub-TLV of the router address TLV.

Step 13: Each of the adjacent network elements of the network element mentioned in Step 11 acquires the new ID mentioned in Step 11, i.e., the current active ID. For one adjacent network element, there is a Traffic Engineering (TE) link between the adjacent network element and network element mentioned in Step 11. So the network element mentioned in Step 11 can be called an opposite network element of the adjacent network element in the TE link, and the acquired new active ID can be an opposite-end active ID of the adjacent network element. For the above reasons, each of the adjacent network elements takes the acquired ID as a new opposite-end active ID of the current TE link with the network element mentioned in Step 11 and advertises the link information including this new opposite-end active ID and its current active ID over the network.

For each ASON network element, when the change of its active ID in local happens, the new active ID can be obtained directly. However, for one network element, if an adjacent network element's local active ID changes, it would be necessary to obtain the new active ID of the adjacent network element, and then take the acquired new ID as the current opposite-end active ID of the TE link between the two networks elements.

The specific process of an adjacent network element's acquiring the information which is about the active ID's change of its opposite network element includes: at the network element of which the active ID has changed, and bearing the new active ID and its opposite-end active ID respectively in a C-Type 1 and C-Type 2 of a NODE_ID Class in a Link Management Protocol (LMP) message. In this way, during the course of periodically checking, each of the adjacent network elements is able to identify the active ID's change of the network element and obtain the newly changed active ID which is one of the adjacent network element's opposite-end active IDs, and re-generate a new TE link information containing the obtained new active ID and its current active ID so as to set up a new link based on LMP according to the new active ID in ASON and implement a service corresponding to the new active ID. Here, the Class mentioned is a kind of data structure based on LMP, and the C-Type 1 and C-Type 2 are both data items of the Class.

The process of advertising the link information including a new opposite-end active ID and the current active ID includes: the adjacent network element bearing its current active ID in the No 3 sub-TLV of the link TLV in a TE_LSA or a newly defined sub-TLV of the link TVL, taking the obtained new active ID as the new opposite-end active ID of the TE link, bearing the new opposite-end active ID in the No 4 sub-TLV of the link TLV in the TE_LSA or a newly defined sub-TLV of the link TLV, and releasing the TE_LSA including the new opposite-end active ID and its current active ID over the network based on the routing protocol. Thereby, the link information is advertised.

The routing protocol involved in this invention may be a link state protocols, which may be the Open Shortest Path First (OSPF) protocol or the Intermediate System to Intermediate System (ISIS) protocol.

The process of releasing a new active ID in Step 12 is carried out on each network element that has changed its active ID. And the process of updating and releasing the link information in Step 13 is implemented on each adjacent network element that connects with the network element of which active ID has changed. After the above processes are completed, it means the process of updating and releasing the newly set network element's ID and related TE link information is finished, and Step 14 may be performed.

Step 14: When implementing the new service in the network is needed, each network element calculates the path based on the new active ID, i.e., calculates the service path by using the Constraint Shortest Path First (CSPF) algorithm based on the new active ID.

Step 15: The new service is carried out based on the result of the path calculation. As the path is calculated in Step 14 based on the new active ID, the new service in the network is a service implemented with the newly set active ID.

If there exist multiple IDs on a network element which includes active and inactive IDs while the ID needed for implementing a new service is one of its inactive IDs, the active ID should be changed, that is, an inactive ID should be selected as a new active ID, which is just the second circumstance described above. The specific process in this case is similar to the procedure from Step 11 to Step 15 above, wherein the main difference is that the new active ID selected by the network element is the ID of one or more existing IDs in the network element.

Figure 2:
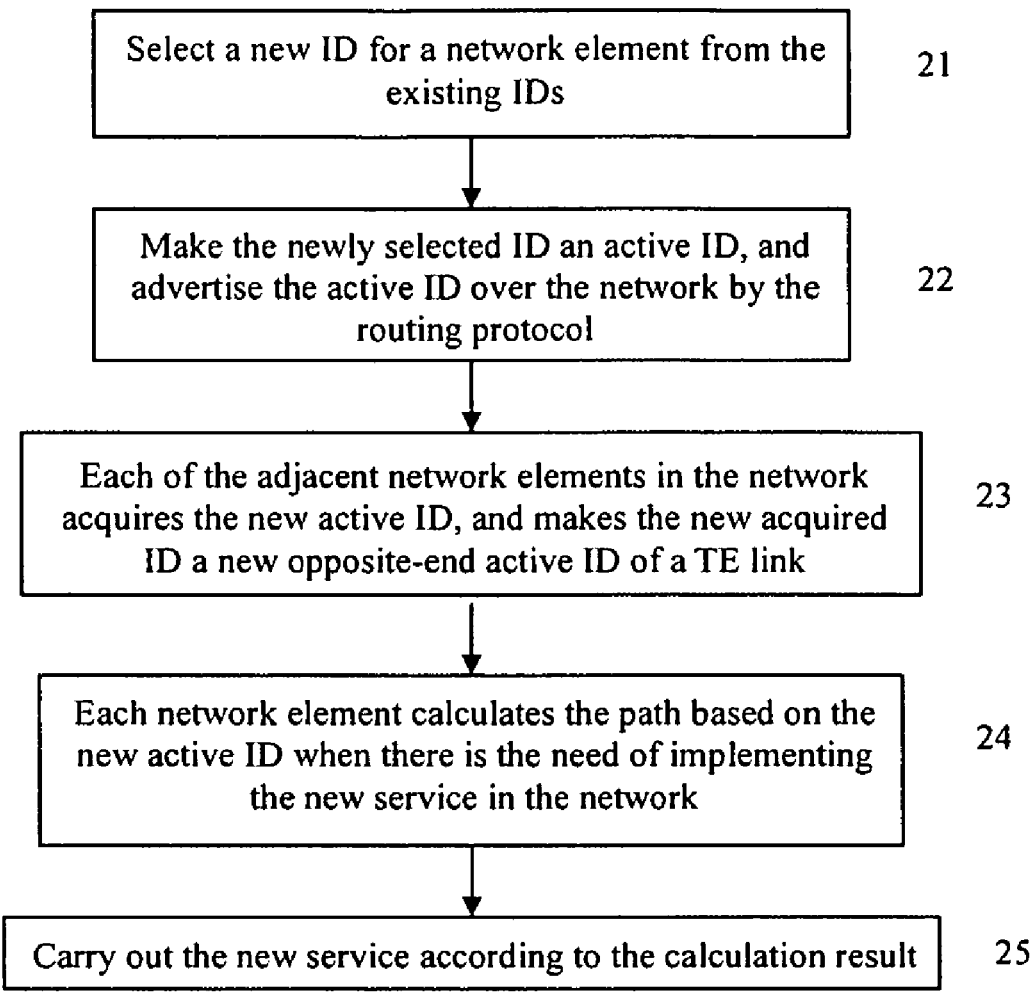
FIG. 2 shows a flowchart for activating an existing ID in accordance with this invention.

As shown in FIG. 2, the process of changing the active ID in detail includes the steps:

Step 21: When it is needed to implement a new service on a network element, if the ID desired by this service has existed on the network element but is not its current active ID, the active ID of the network element should be changed. So the step specifically includes: each network element related to the new service finds the new service's corresponding ID in the transmission plane, sets this ID as the current active ID, and sets the previous active ID as an inactive ID, i.e. removes the active label of the previous active ID.

Step 22: The new ID corresponding to the new service to be implemented is set for a new loop-back interface and set as an active ID of the network element which is a new active ID thereof. Here, the new loop-back interface is created in advance on the control plane of the network element, a network-layer ID has also been set on the new loop-back interface, and the new network-layer ID is then set on the network element's transmission plane. Release the active ID and the current opposite-end active ID to the routing protocol. And then, the new active ID is advertised over the network along with the routing protocol. The specific process of this step is identical with the above Step 12.

In addition, in this step and Step 12, the message for advertising the new active ID may also carry the previous active ID of the network element, i.e., the old active ID, which is inactive now. So that, other network elements that receive this message may find out the old opposite-end active ID set on itself according to the old active ID included in the message which is corresponding to the new active ID contained in the message, and modify the old opposite-end active ID into the new one. In Step 12, if there is only one ID on the network element, the previous active ID of the network element is just its originally existing ID.

The old active ID may be included in a Router Address TLV of a TE_LSA or a new sub-TLV defined for the old active ID.

Step 23: Each of adjacent network elements in the network which is connected with the network element mentioned in Step 21 acquires the new active ID, takes the new active ID as its new opposite-end active ID of the TE link between the two network elements, and advertises the link information including the new opposite-end active ID over the network. The specific process of this step is identical with Step 13 above.

Likewise, perform the process of Step 22 and Step 23 on each network element until the entire procedure of changing the active ID is accomplished, and then perform Step 24.

Step 24: When it is needed to carry out the new service corresponding to the new active ID in the network, each of the network elements implements the path calculation based on the new active ID, i.e., calculates the service path by using CSPF algorithm based on the new active ID.

Step 25: The corresponding service to the new active ID is implemented based on the result of the path calculation. Likewise, as the path is calculated based on the newly changed active ID in Step 24, the corresponding service in the network is a service which is carried out according to this newly changed active ID.

The foregoing is only preferred embodiments of this invention rather than the limits to the protection scope thereof. Any variation or substitution within the technical ranges disclosed in this invention that may easily occur to those skilled in this art should be covered by the protection scope as defined by the appended claims.

The invention claimed is:

1. A method for implementing services on a network element based on multiple IDs, wherein the method comprises steps of:

a network element setting an ID corresponding to a new service in local as an active ID;

the network element advertising an ID information including the newly set active ID over the network by a routing protocol;

each adjacent network element which is connected with the network element via a Traffic Engineering (TE) link acquiring the newly set active ID, setting the newly set active ID as its new opposite-end active ID of the TE link, and advertising over the network a link information which contains the new opposite-end active ID and its current active ID; and when implementing the new service on the network, calculating paths based on the new active ID, and implementing the new service according to the calculation result, wherein before the step of a network element setting an ID corresponding to a new service in local as an active ID, the method further comprises the step of:

creating multiple loop-back interfaces in advance on control planes of the network elements, setting a network-layer ID on each of the loop-back interfaces, and setting each of the network-layer IDs on transmission planes.

2. The method according to claim 1, if the ID corresponding to the new service does not exist on the network element, before the step of a network element setting an ID corresponding to a new service in local as an active ID, then the method further comprises:

creating a new loop-back interface on the control plane of the network element, setting a new network-layer ID on the loop-back interface, making the value of this network-layer ID identical with the value of the ID corresponding to the new service to be implemented, and setting the network-layer ID as the ID corresponding to the new service on the transmission plane.

3. The method according to claim 1, wherein the step of advertising the ID information comprises:

bearing the ID information in a router address Type Length Value (TLV) advertised by a Traffic Engineering Link State Announcement (TE_LSA) of the routing protocol, indicating the new ID included in the ID information as a new active ID, and releasing the ID information over the network by the routing protocol.

4. The method according to claim 3, wherein the ID information is borne in No 3 or No 4 sub-TLV, or a newly defined sub-TLV of the router address TLV advertised by the TE_LSA of the routing protocol.

5. The method according to claim 1, wherein the ID information further comprises at least one previous active ID of the network element.

6. The method according to claim 3, wherein the ID information further comprises at least one previous active ID of the network element.

7. The method according to claim 4, wherein the ID information further comprises at least one previous active ID of the network element.

8. The method according to claim 1, wherein the step of each adjacent network element which is connected with the network element via a TE link acquiring the newly set active ID comprises:

the network element that is set with a new active ID bearing the new active ID in C-Type 1 and C-Type 2 of a NODE_ID Class which is in a Link Management Protocol (LMP) message, each of its adjacent network elements obtaining the new active ID by periodically checking; and the step of advertising the link information over the network comprises: bearing the obtained new active ID and its current active ID in the link TLV advertised by a TE_LSA of the routing protocol, indicating the obtained new active ID as its new opposite-end active ID, and releasing the link information over the network via the routing protocol.

9. The method according to claim 8, wherein each of the new opposite-end active ID and its current active ID is borne in No 3 or No 4 sub-TLV, or a newly defined sub-TLV of the link TLV advertised by the TE_LSA of the routing protocol.

10. The method according to claim 1, wherein the step of setting the ID corresponding to the new service as an active ID comprises: adding an active label for indicating active states to the ID which is corresponding to the new service.

11. The method of claim 1, wherein the network element is part of an Automatic Switched Optical Network.

12. A method for implementing services on a network element, wherein the method comprises steps of:

a network element setting an ID corresponding to a new service in local as an active ID after the network is re-organized, wherein the network element is based on multiple IDs, the previous services are implemented using a previous active ID;

the network element advertising an ID information including the newly set active ID over the network by a routing protocol, wherein the ID information further comprises at least one previous active ID of the network element;

each adjacent network element which is connected with the network element via a Traffic Engineering (TE) link acquiring the newly set active ID, setting the newly set active ID as its new opposite-end active ID of the TE link, and advertising over the network a link information which contains the new opposite-end active ID and its current active ID; and when implementing the new service on the network, calculating paths based on the new active ID, and implementing the new service according to the calculation result, wherein the network element is part of an Automatic Switched Optical Network.

13. The method according to claim 12, before the step of a network element setting an ID corresponding to a new service in local as an active ID, the method further comprises:

creating multiple loop-back interfaces in advance on control planes of the network elements, setting a network-layer ID on each of the loop-back interfaces, and setting each of the network-layer IDs on transmission planes.

14. The method according to claim 12, if the ID corresponding to the new service does not exist on the network element, before the step of a network element setting an ID corresponding to a new service in local as an active ID, then the method further comprises:

creating a new loop-back interface on the control plane of the network element, setting a new network-layer ID on the loop-back interface, making the value of this network-layer ID identical with the value of the ID corresponding to the new service to be implemented, and setting the network-layer ID as the ID corresponding to the new service on the transmission plane.

15. The method according to claim 12, wherein the step of each adjacent network element which is connected with the network element via a TE link acquiring the newly set active ID comprises:

the network element that is set with a new active ID bearing the new active ID in C-Type 1 and C-Type 2 of a NODE_ID Class which is in a Link Management Protocol (LMP) message, each of its adjacent network elements obtaining the new active ID by periodically checking; and the step of advertising the link information over the network comprises: bearing the obtained new active ID and its current active ID in the link TLV advertised by a TE_LSA of the routing protocol, indicating the obtained new active ID as its new opposite-end active ID, and releasing the link information over the network via the routing protocol.

16. The method according to claim 15, wherein each of the new opposite-end active ID and its current active ID is borne in No 3 or No 4 sub-TLV, or a newly defined sub-TLV of the link TLV advertised by the TE_LSA of the routing protocol.

* * * * *